United States Patent
Chen et al.

(10) Patent No.: US 10,962,868 B2
(45) Date of Patent: Mar. 30, 2021

(54) PROJECTION DEVICE AND DISPLAY SYSTEM WITH A COMBINER THEREIN

(71) Applicant: Young Optics Inc., Hsinchu (TW)

(72) Inventors: S-Wei Chen, Hsinchu (TW); Po-Ching Lu, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 30 days.

(21) Appl. No.: 15/902,204

(22) Filed: Feb. 22, 2018

(65) Prior Publication Data

US 2018/0246399 A1 Aug. 30, 2018

(30) Foreign Application Priority Data

Feb. 24, 2017 (TW) .............................. 106106413 A (51) Int. Cl.
| G03B 1/16 | (2006.01) |
| G03B 21/20 | (2006.01) |
| G03B 21/14 | (2006.01) |
| G02B 27/01 | (2006.01) |
| G03B 21/16 | (2006.01) |

(52) U.S. Cl.
CPC ......... *G03B 21/16* (2013.01); *G02B 27/0149* (2013.01); *G03B 21/145* (2013.01); *G03B 21/204* (2013.01); *G03B 21/2013* (2013.01)

(58) Field of Classification Search
CPC .. G03B 21/16; G03B 21/2013; G03B 21/204; G03B 21/145; G02B 27/0149
See application file for complete search history.

(56) References Cited

U.S. PATENT DOCUMENTS

| 7,331,678 | B2 | 2/2008 | Engle | |
| 8,491,126 | B2 | 7/2013 | Ko et al. | |
| 2010/0045941 | A1* | 2/2010 | Chen ...................... | G03B 21/16 353/61 |
| 2010/0053896 | A1* | 3/2010 | Chen ...................... | G03B 21/16 361/697 |
| 2011/0317281 | A1* | 12/2011 | Take ...................... | G02B 13/004 359/691 |
| 2014/0092368 | A1* | 4/2014 | Dai ........................ | G03B 21/16 353/58 |
| 2014/0204345 | A1* | 7/2014 | Chen ...................... | G03B 21/16 353/31 |
| 2017/0269365 | A1* | 9/2017 | Fujita ..................... | B60K 35/00 |

FOREIGN PATENT DOCUMENTS

| CN | 1939053 | | 3/2007 | |
| CN | 103941529 A | * | 7/2014 | ............. G03B 21/16 |

\* cited by examiner

*Primary Examiner* — Michelle M Iacoletti
*Assistant Examiner* — Magda Cruz (57) ABSTRACT

A projection device is disclosed. The projection device includes an air inlet, an air outlet, an optical engine, a heat sink, a fan and a combiner. A first passage is arranged between the air inlet and the air outlet for passing an air flow. The optical engine includes a light source and an imaging lens set outputting a projection light beam. The heat sink is connected to the optical engine, and a part of the heat sink is arranged in the first passage. The fan is arranged in the first passage. The combiner receives the projection light beam. The projection light beam moves in a propagating direction opposite to the entry direction.

13 Claims, 5 Drawing Sheets

PROJECTION DEVICE AND DISPLAY SYSTEM WITH A COMBINER THEREIN

FIELD OF THE INVENTION

The present invention relates to a projection device and a display system, and more particularly to a projection device and a display system provided with an improved heat dissipation system.

BACKGROUND OF THE INVENTION

Development of science and technology promotes progress of times. Because demand of consumers varies so quickly, more and more new pico projectors are introduces into market. In response to the demand of consumers for high illumination, many manufactures utilize semiconductor light source of high power to provide light-illumination beam. However, the light source of high power often generates more heat which raises temperature in the pico projectors and thus reduces optical efficiency of the semiconductor light source and even causes deformation of lenses which causes a poor optical quality of light beam. Therefore, heat dissipation is one of the main critical factors affecting performance of pico projectors. One of solutions for heat dissipation of pico projectors is to increase area of heat dissipation fin. However, this may increase total volume of the pico projector. In addition to projectors, display systems such as head up displays also have the heat dissipation problem which affects optical efficiency.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a projection device promoting heat dissipation efficiency without increasing total volume through suitable arrangement of elements in the projection device so as to ensure optical quality of projected images.

An embodiment of the projection device of the present invention includes a casing, an optical engine, a heat sink, a fan and a combiner. The casing includes a lateral side, the air inlet and a light exit arranged on the lateral side of the casing, the air outlet arranged on the another lateral side of the casing. The air inlet corresponds to an entry direction. A first passage is arranged between the air inlet and the air outlet for passing air flow. The optical engine includes a light source and an imaging lens set. The imaging lens set has a projection direction and outputs a projection light beam propagating along the projection direction to enter the combiner via the light exit. The combiner combines the projection light beam and an external image to generate a combined image. A heat sink is coupled to a surface of the optical engine for heat dissipation. One end of the heat sink opposite to the optical engine is arranged in the first passage for passing cool air flow to carry away the heat generated by the optical engine. The heat sink includes a plurality of heat dissipation fins. The heat dissipation fins correspond to a heat dissipation passage which is named as a second passage to constrain the air flow. The second passage extends in a direction identical to a direction in which the first passage extends. A fan is arranged in the first passage and in a direction of the air flow passing the first passage to accelerate air flow.

Air flow resistance is reduced by decreasing turn-around points of air flow that heat dissipation is enhanced due to smoothly inflow/outflow of air. On the other hand, heated air flow is exhausted via the air outlet which is opposite to the light exit to prevent the heated air flow via the air outlet from affecting the projection light beam.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments accompanying drawings, the technical features, characteristics and effects of the invention are present. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. Moreover, these preferred embodiments may refer to use "first", "second", etc. following with noun or element. Such terms should be understood as a recognition of similar or identical elements rather than limitations of them. In addition, the following embodiments are used to further describe the projection device and display system. People who are skillful in the art can apply the connecting system to any required situations.

Figure 1A:
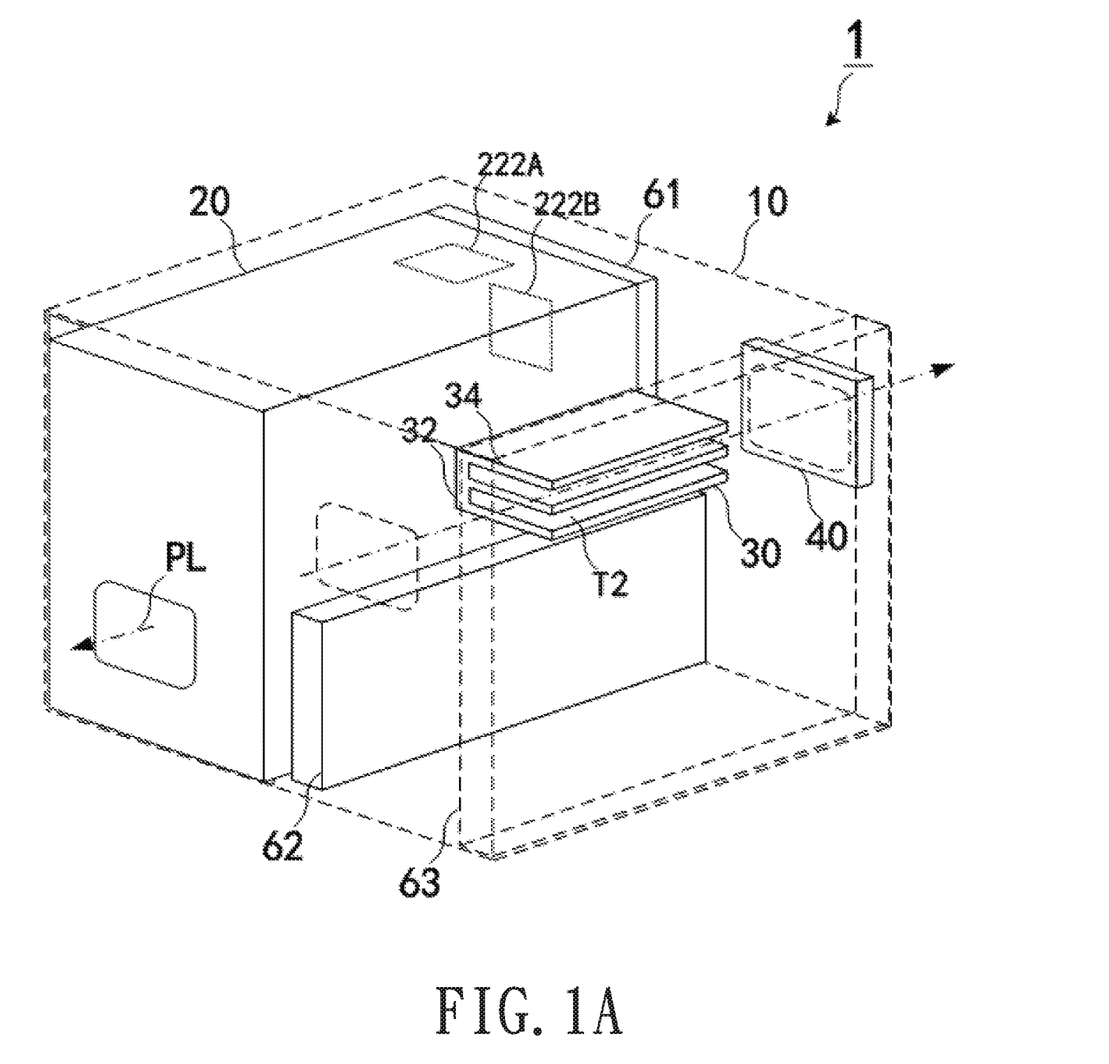
FIG. 1A is a perspective view of a first embodiment of a projection device of the present invention.
Figure 1B:
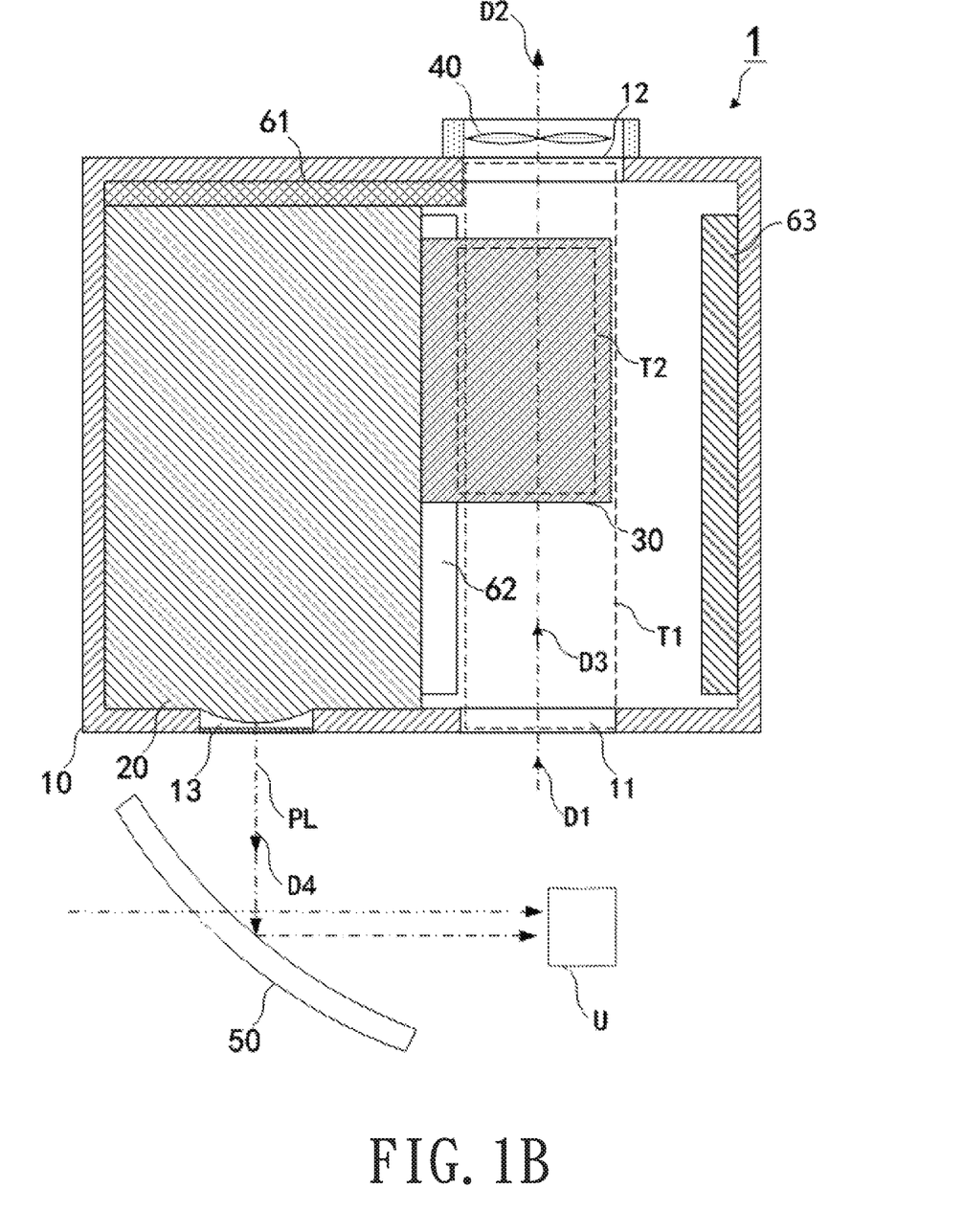
FIG. 1B is a schematic view of the first embodiment of the projection device of the present invention viewed from another view angle.

FIGS. 1A and 1B depict a first embodiment of a projection device of the present invention at different view angles. Referring to FIGS. 1A and 1B, a projection device 1 includes a casing 10, an optical engine 20, a heat sink 30, a fan 40, a combiner 50 and several circuit boards 61, 62 and 63.

The structure of the casing 10 is described as follows. In general, the casing 10 is a mechanical/structural element provided with an internal accommodating space inside to enclose and protect elements inside. The casing 10 may also maintain relative positions of all elements therein. In this embodiment, the casing 10 includes two cover bodies assembled together. Each of the cover bodies is one-piece formed and formed of plastic materials which are selected respectively. The casing 10 has several through holes including an air inlet 11, an air outlet 12 and a light exit 13. The air inlet 11 and the air outlet 12 defined by a structure correspond to a space for allowing air flow to pass therethrough. The air inlet 11 can define an entry direction D1, and air may flow into the casing 10 along the entry direction D1. A first passage T1 is formed between the air inlet 11 and the air outlet 12. For example, the first passage T1 means the space between the air inlet 11 and the air outlet 12 inside the casing 10. On the other hand, in this embodiment, the air inlet 11 and the air outlet 12 are formed on two opposite surfaces of the casing 10 respectively, and air flows into the casing 10 through the air inlet 11 and flows out of the casing 10 through the air outlet 12. The air inlet 11 and the air outlet 12 are arranged substantially at the same height. The light exit 13 and the air outlet 12 are suggested to be formed or arranged on different surfaces of the casing 10 that it would prevent heated air flow exhausted through the air outlet 12 from changing the refraction of air as to affect image quality. As shown in FIGS. 1A and 1B, when the air inlet 11 is arranged on a front surface and the air outlet 12 is formed on a rear surface, the light exit 13 is arranged on the front surface in the present embodiment. The air inlet 11 and the light exit 13 are arranged on the same surface.

In another point of view, the light exit 13 is configured to allow light to pass therethrough, but air is not necessary to be allowed to flow through the light exit 13. Even if an area (opening) is not communicated with external environment, as long as the area allows at least a part of the light to pass there-through relative to other part of the casing 10, the area can still refer to the light exit 13. A lens or other element, such as a protective cover, can be embedded into the light exit 13 to provide specific functions. For example, a protective cover is disposed at the light exit. In this embodiment, the air inlet 11 is substantially aligned with the air outlet 12 so as to reduce air flow resistance and increase air flow rate further.

Figure 2A:
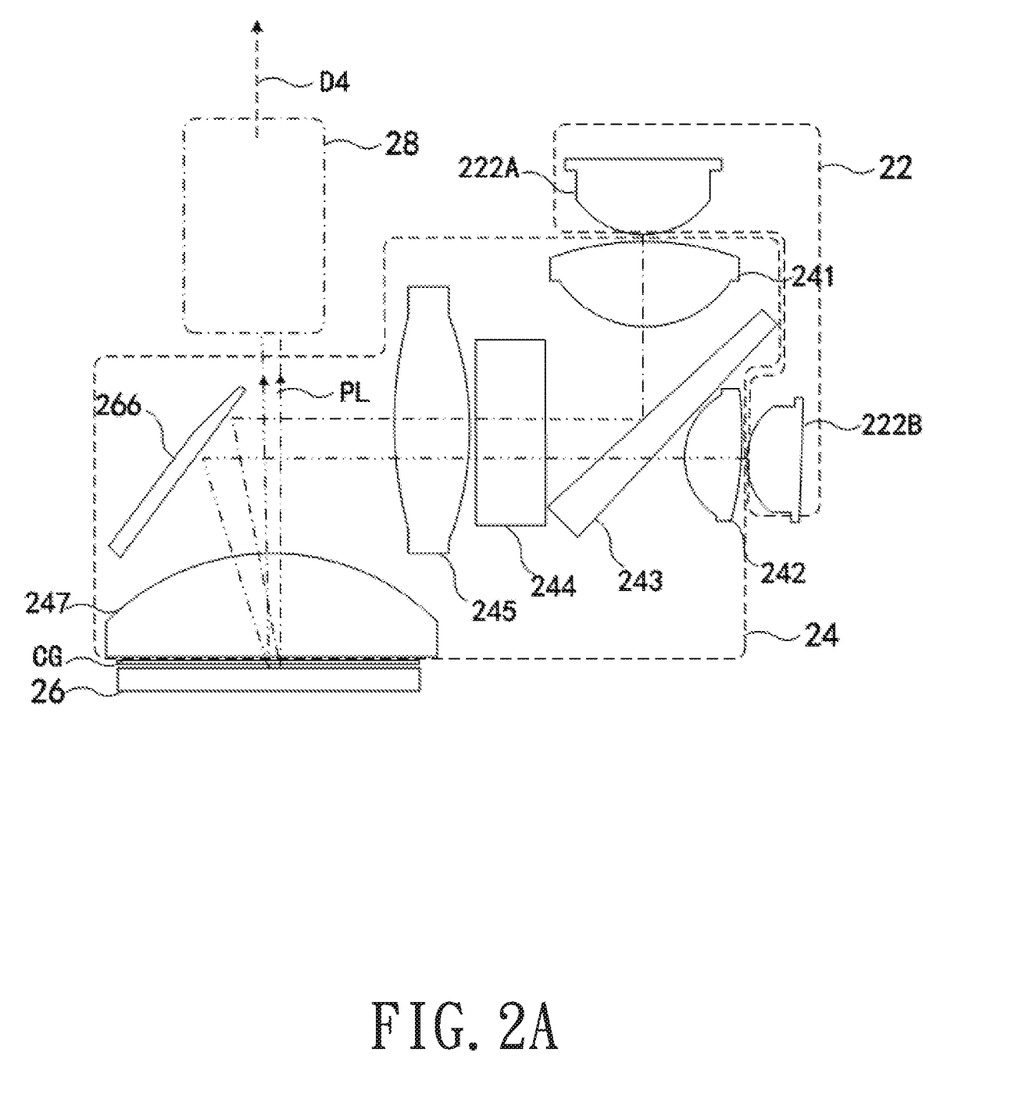
FIG. 2A is a schematic view of an optical engine of the first embodiment of the projection device of the present invention.

The optical engine 20 is described as follows. The optical engine 20 may refer to, at least, a laser scanner, liquid crystal display (LCD), digital light processing (DLP) or liquid crystal on silicon (LCOS). In this embodiment, the optical engine 20 is DLP and includes a light source 22, a light combination module 24, a light valve 26 and an imaging lens set 28. The light source 22 is configured to generate illumination light The light source 22 includes light emitting elements 222A and 222B. The light emitting elements 222A and 222B emit light beams of different colors. The light beams generated by the light emitting elements 222A and 222B enter the light combination module 24 and are combined thereby then enter the light valve 26. The light valve 26 converts the combined light beams to a projection light beam PL which possesses image data. The projection light beam PL is regulated by the imaging lens set 28 and then is outputted.

In general, the amount and properties of the light source 22 depend on the type of the light valve 26 and the structure of the light combination module 24. In general, the light source 22 will include several light emitting elements 222A and 222B. Each of the light emitting elements 222A and 222B are light emitting chips, and capable of emitting visible lights having various wavelength ranges. Moreover, in another embodiment, the light emitting elements 222A and 222B may be light emitting chips emitting invisible lights, or laser chips cooperating with wavelength converting material, or other light sources applicable to the technical field of light projection. For example, in this embodiment, the light source 22 is a dual-channel light combination structure. More precisely, the light source 22 includes the first light emitting element 222A and the second light emitting element 222B. The first light emitting element 222A can outputs red light and blue light, and the second light emitting element 222B can outputs green light. The first light emitting element 222A may include two blue light emitting diode, one of the blue diode having red light phosphor formed thereon, and another blue light emitting diode does not. The diode having red phosphor formed thereon may emit blue light, and the blue light enters the red light phosphor layer, then excites the phosphor to emit red light, the another blue light emitting diode can output blue light directly without passing the phosphor layer. On the other hand, the second light emitting element 222B includes a light emitting diode for outputting green light. It is noted that the first light emitting element 222A may include one or more package bodies. When the red light and blue light are emitted from two package bodies, the package body for emitting the red light may include a blue light emitting diode chip, phosphor for yellow light and a filter. The blue light emitted from the blue LED enters the phosphor and excites the phosphor to emit yellow light. The yellow light passes through the filter and then is converted to red light. In this embodiment, the first light emitting element 222A is a package body enclosing a blue LED chip and a red LED chip. In addition to the light emitting diode chip emitting visible light, the light emitting elements 222A and 222B of the light source 20 can be light emitting chip for emitting invisible light or laser chip cooperating with wavelength converting material to provide light beam having predetermined color. In addition, the light source 22 can also provide red light, green light and blue light with dual channel that and the red light, the green light and the blue light are combined by the light combination module 24 to form an illumination light beam. The illumination light beam then enters the light valve 26. Moreover, the said light combination may be comprehended as a condition that the red light, the green light and the blue light is adjusted so as to propagate along a substantially identical path, while the light combination process is practicable in either simultaneously or the said light are propagate in different time periods.

In general, the light combination module 24 combines various light beams to a single optical path. The light combination module 24 in general, may include one of a lens, a mirror, a beam splitter (plate-shaped or X-shaped), a polarizing beam splitter, an optical filter, a light diffusion element (such as integrator rod or fly-eye lens), a wedged shaped transparent optical element, a color wheel or a phosphor wheel or combination thereof. The lens means either the light incident surface or the light emergent surface has a non-infinite curvature, that either the light incident surface or the light emergent surface is a curved surface. In this embodiment, the light combination module 24 includes, in sequentially of light path, a lens 241 is disposed adjusted to the light emitting element 222A and a lens 242 disposed adjusted to the light emitting element 222B. Both the lens 241 and the lens 242 have positive refractive power. Light beams from the light emitting elements 222A and 222B sequentially pass through the lens 241 and the lens 242 respectively, then pass through a wedged shaped light combining element 243, a fly-eye lens 244, a lens 245 with positive refractive power, a mirror 266, a field lens 247 with positive refractive power, a glass protective cover CG and the light valve 26. The light valve 26 converts the illumination light beam to the projection light beam PL with image data, then the projection light beam PL may pass through the field lens 247 to enter the imaging lens set 28 or a projection lens.

In general, the light valve 26 may be, for example, an element or a device converting the illumination light beam to the projection light beam PL, such as a LCD, a DMD, an LCOS or a film. The projection light beam PL corresponds to an image. In this embodiment, the light valve 26 includes at least one digital micro-mirror device (DMD).

Figure 2B:
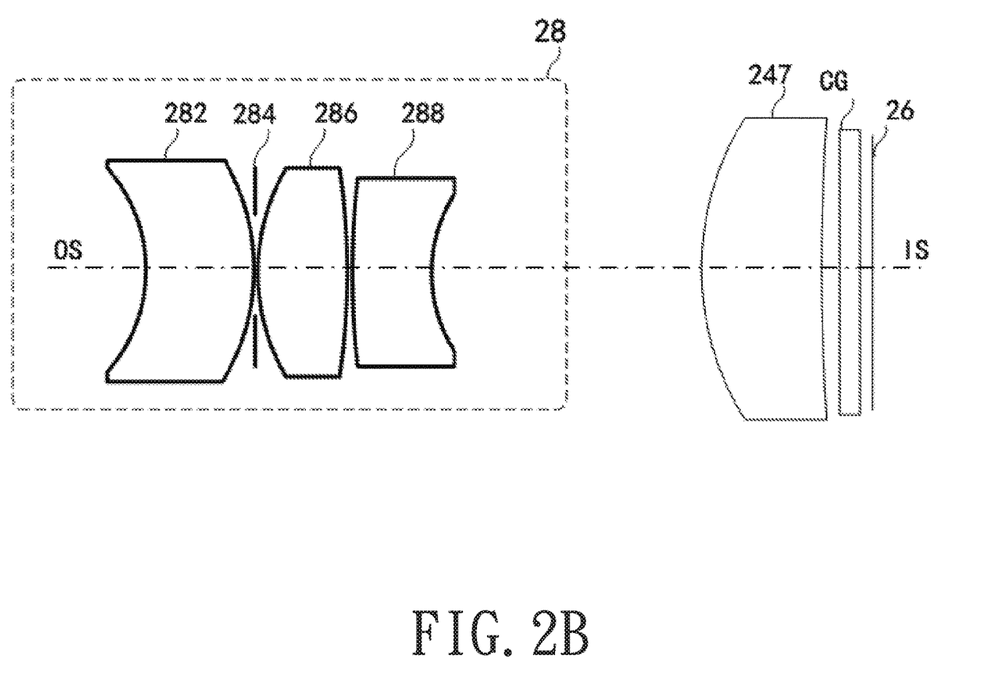
FIG. 2B is a schematic view of an imaging lens set of the first embodiment of the projection device of the present invention.

On the other hand, the imaging lens set 28 or the projection lens at least includes a single lens with refractive power and an aperture stop 284. For example, FIG. 2B illustrates an embodiment of the imaging lens set 28. Referring to FIG. 2B, the imaging lens set 28 is disposed between an enlarging side OS and a reducing side IS. When the imaging lens set 28 is applied to a projections lens, the enlarging side OS is the side of the projections lens for emitting the projection light beam PL, and the reducing side IS is the side of the light valve 26.

As illustrated in FIG. 2B, the imaging lens set 28 includes a second lens 282, an aperture stop 284, a first lens 286 and a third lens 288. The second lens 282, the aperture stop 284, the first lens 286 and the third lens 288 are sequentially disposed along an optical axis from the enlarging side OS to the reducing side IS. The aperture stop 284 may either mounted independently or integrated to a lens according to design requirement, but it is not limited thereto.

In this embodiment, the first lens 286 has negative refractive power, the second lens 282 has positive refractive power, and the third lens 288 has negative refractive power. In this embodiment, the aperture stop 284 is disposed between the first lens 286 and the second lens 282 which is only one lens with refractive power to be arranged in a light exit direction, a projection direction or an emergent direction D4 of the aperture stop 284. In another embodiment, the lens can be omitted in the emergent direction D4 of the aperture stop 284.

Detailed parameters of each element and external element of the optical system of this embodiment are listed in the following table.

TABLE 1

| Element | Surface No. | Radius of Curvature (mm) | Distance (mm) | Refraction $(n_d)$ | Abbe No. $(V_d)$ | note |
|---|---|---|---|---|---|---|
| 282 | S1* | −3.776516 | 3.482329 | 1.525279 | 55.95076 | second lens |
| — | S2* | −4.446563 | 0.1 | — | — | — |
| 284 | S3 | infinite | 0.1 | — | — | STOP |
| 286 | S4 | 6.00666 | 2.598185 | 1.772626 | 51.7087 | first lens |
| — | S5 | −25.4669 | 0.1 | — | — | — |
| 288 | S6* | 10.35014 | 0.960749 | 1.631919 | 23.41612 | third lens |
| — | S7* | 2.713581 | 7.12426 | — | — | — |
| 247 | S8 | 7.651979 | 3.166515 | 1.601346 | 39.54482 | field lens |
| — | S9 | 100 | 0.390549 | — | — | — |
| CG | S10 | infinite | 0.4 | 1.508469 | 61.1878 | glass cover |
| — | S11 | infinite | 0.306 | — | — | — |

Table 1 lists optical parameters of each lens of the imaging lens set 28. The surfaces with the symbol * are non-spherical surfaces, and the surfaces without the symbol * are spherical surfaces. The surface no. means the sequence of the surfaces of the optical elements arranged from the enlarged side to the reduced side. In addition, the radius of curvature and the distance listed in Table 1 have a unit of millimeter (mm).

As listed in the table 1, in this embodiment, the projection lens includes three lenses with refractive power, the first lens 286, the second lens 282 and the third lens 288. The second lens 282, the aperture stop 284, the first lens 286 and the third lens 288 are arranged sequentially from the light exit 13. The second lens 282 and the third lens 288 are non-spherical lenses.

Design parameters of the non-spherical surfaces of the second lens 282 and the third lens 288 are listed in the table 2 as following.

TABLE 2

| | Surface S1 | Surface S2 | Surface S6 | Surface S7 |
|---|---|---|---|---|
| k | −0.10322 | 0.021622 | 2.851412 | −0.02162809 |
| $C_2$ | 0 | 0 | 0 | 0 |
| $C_4$ | 4.2786E−03 | 4.7757E−03 | −6.6591E−04 | −9.2097E−03 |
| $C_6$ | 5.2221E−05 | −1.3994E−04 | −6.6794E−04 | −6.4783E−04 |
| $C_8$ | −3.3462E−06 | 1.6883E−05 | 8.9464E−05 | 1.9084E−05 |
| $C_{10}$ | 6.4040E−07 | −1.1131E−06 | −5.1307E−06 | 8.4116E−06 |
| $C_{12}$ | 3.6550E−09 | 4.6044E−08 | 1.0167E−08 | −2.8232E−06 |

The correlation of the design parameters is as follows:

$$Z = \frac{cr^2}{1+\sqrt{1-(1+k)c^2r^2}} + A_2r^2 + A_4r^4 + A_6r^6 + A_8r^8 + A_{10}r^{10} + A_{12}r^{12} + A_{14}r^{14} + A_{16}r^{16} + \ldots \qquad \text{[equation 1]}$$

In the said embodiment, the imaging lens set 28 has a focal length of approximately 9.788 mm, a field angle of approximately 40.86° and a telecentric angle of approximately 1°. In addition, (|R6|+R7)/(|R6|−R7) is equal to 1.709, |FG1|/FL2 is equal to 9.172, R7/F is equal to 0.277, |FG1|/F is equal to 6.072, FG2/FG3 is equal to 1.698, D/F is equal to 2.424, and FG3/F is equal to 1.377. R6 represents a curvature radius of a surface of the third lens 288 facing the enlarging side OS, R7 represents the curvature radius of a concave surface of the third lens 288 facing the reduced side IS, FG1 represents an effective focal length of the second lens 282, and FL2 represents an effective focal length of the first lens 286. F represents an effective focal length of the imaging lens set, FG2 represents an effective focal length of the first lens 286 and the third lens 288, and FG3 represents an effective focal length of the field lens.

The design of the heat sink 30 is described as following. In general, the heat sink 30 may include one of a heat dissipation fins set, a thermoelectric cooling module, a metal core printed circuit board, a thermal conductive material layer, a metal thermal conductive sheet, a heat pipe or a combination of them. In this embodiment, the heat sink 30 is a heat dissipation fin module. The heat dissipation fin module includes a base 32 and a plurality of fins 34 extending outwards from the base 32. A passage is formed between two fins 34 in a longitudinal direction of the fins 34 for air passing quickly therethrough. The passage is called second passage T2.

The structure of the fan 40 is described as following. A fan may be understood as a device enabling fluid to flow in a specific direction. The fan 40 often includes blades. The fan 40 can be axial flow type, centrifugal type, diagonal flow type or cross-flow type etc. In certain cases, the fan 40 includes no blades, and fluid is driven by pressure difference generated by a built-in compressor. In this embodiment, the fan 40 is an axial flow fan, and air passing the fan 40 flows in a direction substantially perpendicular to the blades.

The structure of the combiner 50 is described as following. In general, the combiner 50 is an optical element having at least one transparent portion. A user U is able to see an external object behind optical elements through the combiner 50, and the user can also see an image from another image source 70 through total reflection by the combiner 50. More precisely, the combiner 50 is an optical element combining and overlapping the projection light beam PL with an image of an external object. In this embodiment, the combiner 50 is a transparent glass with a free form surface adapted to receive the projection light beam from the imaging lens set.

After the structure of each optical element is described, an embodiment is described to show the relation between the optical elements. Referring to FIGS. 1A and 1B, at least one portion of the optical engine 20, at least a part of the heat sink 30 and the fan 40 are disposed within the casing 10 of the projection device 1, but the combiner 50 is disposed outside the casing 10. In this embodiment, the optical engine 20 outputs a projection light beam PL passing through the light exit 13, and the projection light beam PL is reflected by the combiner 50 to enter the eyes of the user U. At this time, the optical engine 20 generates heat when the optical engine 20 outputs the projection light beam PL. The heat sink 30 is thus disposed on a surface of the optical engine 20 for heat dissipation. However, in another embodiment, the heat sink 30 is connected to the optical engine 20 through a thermal conductive element such as a heat pipe without contacting the optical engine 20 directly. On the other hand, the fan 40 is arranged in the first passage T1 between the air inlet 11 and the air outlet 12, or the fan 40 is arranged in its extension paths (extension line) of the first passage T1 in order to increase velocity of air flow into or out of the casing 10.

In addition, the heat sink 30 is a heat dissipation fin module with a plurality of heat dissipation fins 32. The second passage T2 is arranged between two fins 32 along a longitudinal direction of the fins 32. In general, it is preferable that the direction of the second passage T2 is identical to the direction of the first passage T1 when the heat sink 30 is mounted. At least one portion of the heat sink 30 is arranged in the first passage T1 between the air inlet 11 and the air outlet 12 or the heat sink 30 is arranged in the first passage T1 so that the heat dissipation efficiency is further improved.

On the other hand, in this embodiment, the optical engine 20 is flat, and the light emitting elements 222A and 222B serving as the main heat sources are disposed on two different smaller inner surfaces in a thickness direction of the optical engine 20. However, the heat sink 30 is not directly disposed on the lateral walls which the heat source (the light emitting elements 222A and 222B) is mounted on. But, the heat sink 30 is disposed on a top wall which is larger than the lateral walls according to the optical engine 20, that a heat generated by the heat source is conducted to the heat sink 30 through a bending heat transfer member or a metal plate (not illustrated). Therefore, cooling air may flow through the second passage T2 with smaller flow resistance as to improve the heat dissipation efficiency.

In addition, the fan 40 is secured to an inner side of the air outlet 12 through bolts. The fan 40 is disposed between the air inlet 11 and the air outlet 12 and located in a line extending from the first passage T1 to reduce the flow resistance as to increase the velocity of air flow. In another embodiment, the fan 40 is secured on an outer wall of the casing 10 and faces the air inlet 11 or the air outlet 12. In another embodiment, the fan 40 is mounted within the casing 10 and located between the air inlet 11 and the air outlet 12. In another embodiment, the fan 40 is mounted out of the casing 10 and located in a line extending from the line connecting the air inlet 11 and the air outlet 12 without mechanical connection to the casing 10. In addition, the emergent direction D4, the light exit direction or the projection direction of the imaging lens set 28 can be opposite to the entry direction D1.

On the other hand, the projection light beam PL from the imaging lens set 28 propagates along the projection direction or the emergent direction D4 through the light exit 13. The heated air flows out of the casing 10 along the air exhaust direction D2 through the air outlet 12. The air outlet 12 for the heated air flow and the light exit 13 for the projection light beam PL are arranged on different surfaces of the casing 10 that it would prevent the hot air flow from changing the refraction index so as to affect image quality.

In this embodiment, the projection device 1 further includes three circuit boards 61, 62 and 63 which are mutually connected by cables. The circuit board 61 is disposed within the casing 10 and located on a lateral surface of the optical engine 20 opposite to the lateral surface on which the light exit 13 is arranged. The circuit board 61 faces a hot spot of the light emitting element 222B. The circuit board 62 is disposed on a surface of the optical engine 20 on which the heat sink 30 is mounted. The circuit board 63 is disposed on an inner surface of the casing 10 and faces the optical engine 20. The heat sink 30 and the circuit board 62 are disposed between the circuit board 63 and the optical engine 20. A structure such as the circuit boards 61, 62 and 63 do not interfere with the first passage T1 that air can flow smoothly in the first passage T1.

Figure 3:
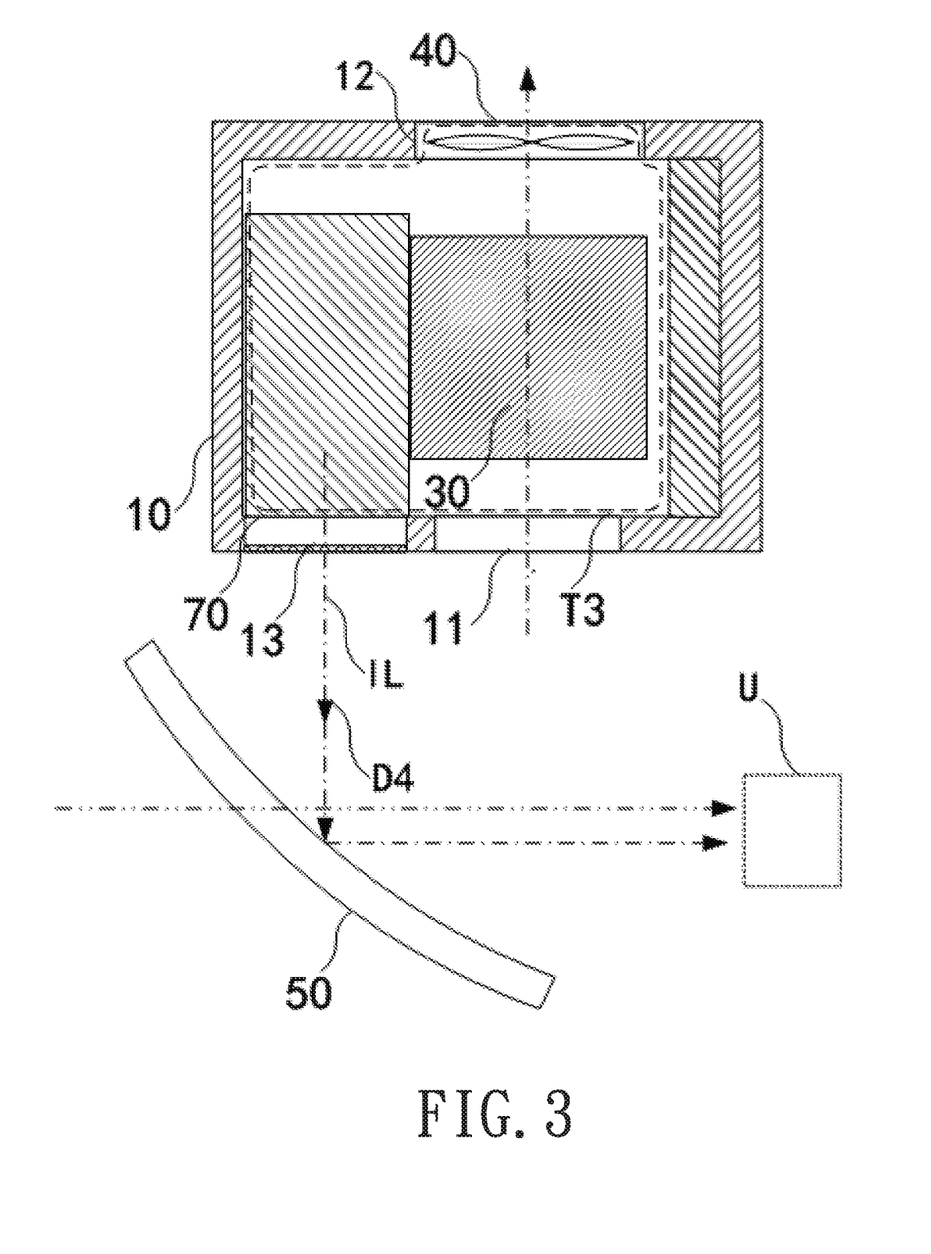
FIG. 3 is a schematic view of a second embodiment of a projection device of the present invention.

Referring to FIG. 3, FIG. 3 discloses a schematic view of the second embodiment of the projection device of the present invention. The second embodiment is similar to the first embodiment, and the difference between the second embodiment and the first embodiment is described as following. In this embodiment, a display system 2 is disclosed. The display system 2 includes an image source 70 capable of outputting an image light beam IL. The image source 70 can be various forms of screen. The screen may, for example, be an electronic device outputting image light beam, such as a projector and its projecting screen, a liquid crystal display, or an organic light emitting diode screen.

The emergent direction D4 of the image light beams IL from the image source 70 is substantially opposite to the entry direction D1.

In addition, an air passage T3 can be formed between the air inlet 11 and the air outlet 12 for air flowing therethrough. The air passage T3 corresponds to a linear space between the air inlet 11 and the air outlet 12. The air passage T3 also can correspond to a combination of the linear space and a peripheral space within the housing 10.

Air flow resistance is reduced by decreasing resistance of air flow so that it can improve heat dissipation effect by air flows into or out of the casing more smoothly. On the other hand, heated air flow is exhausted via the air outlet opposite to the light exit as to prevent the heated air from affecting the projection light beam.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projection device, comprising:
    an air inlet, allowing air to pass therethrough in an entry direction;
    an air outlet, and a first passage arranged between the air inlet and the air outlet for allowing air to flow therein;
    an optical engine, comprising a light source and an imaging lens set capable of outputting a projection light beam in a propagating direction;
    a heat sink connected to the optical engine, at least part of the heat sink disposed in the first passage;
    a fan arranged in the first passage; and
    a combiner, capable of receiving the projection light beam;
    wherein the propagating direction is substantially opposite to the entry direction,
    the imaging lens set comprises:
        an aperture stop;
        a first lens, having refractive power, wherein the aperture stop and the first lens are sequentially arranged in a direction from the combiner to the imaging lens set; and
        a second lens, having refractive power, and disposed between the aperture stop and the combiner, wherein a number of lens having refractive power between the aperture stop and the combiner is one.

2. The projection device according to claim 1, wherein the second lens has a concave surface facing the combiner.

3. The projection device according to claim 1, wherein the heat sink comprises at least two heat dissipation fins, a second passage is formed between the at least two heat dissipation fins, the extending direction of the second passage is substantially the same as the extending direction of the first passage.

4. The projection device according to claim 1, further comprising a casing, the air inlet and a light exit being formed on a lateral side of the casing, the air outlet being formed on another lateral side of the casing, and the projection light beam outputted by the imaging lens set propagating in a light emerging direction via the light exit.

5. The projection device according to claim 4, wherein the lateral side having the air inlet and the light exit is opposite to the another lateral side having the air outlet.

6. The projection device according to claim 4, wherein the fan is disposed in an inner side of the air outlet.

7. The projection device according to claim 4, wherein the fan is disposed on an outer wall of the casing so that the fan faces one of the air inlet and the air outlet.

8. The projection device according to claim 4, wherein the fan is mounted out of the casing so that the fan is located in a line connecting the air inlet and the air outlet.

9. The projection device according to claim 4, wherein the fan is mounted within the casing so that the fan is located between the air inlet and the air outlet.

10. The projection device according to claim 1, wherein the combiner has refractive power.

11. The projection device according to claim 1, wherein the fan is an axial flow fan.

12. The projection device according to claim 1, wherein the air inlet is aligned with the air outlet so that the air inlet and the air outlet are substantially at the same height.

13. The projection device according to claim 1, further comprising:
    a casing comprising a lateral side, the air inlet and a light exit are formed on the lateral side of the casing, the air outlet is formed on another lateral side of the casing, wherein,
    the projection light beam outputted by the imaging lens set propagates in a light emerging direction via the light exit,
    the second lens has a concave surface facing the combiner,
    the air inlet is aligned with the air outlet, and
    the heat sink comprises at least two heat dissipation fins,
    a second passage is formed between the heat dissipation fins, the second passage extends in a direction substantially the same as a direction in which the first passage extends,
    the lateral side on which the air inlet and a light exit are formed is opposite to the lateral side on which the air outlet is formed,
    the fan is disposed in an inner side of the air outlet or the fan is mounted out of the casing and located in a line connecting the air inlet and the air outlet or the fan is mounted within the casing and located between the air inlet and the air outlet,
    the combiner has refractive power,
    the fan is an axial flow fan,
    the air inlet is aligned with the air outlet and the air inlet and the air outlet are substantially at the same height;
    that a second passage arranged between the heat dissipation fins extends in a direction parallel to the first passage, the lateral side having the air inlet and a light exit is opposite to the another lateral side having the air outlet, the fan is disposed in an inner side of the air outlet or the fan is mounted out of the casing that the fan is located in a line connecting the air inlet and the air outlet or the fan is mounted within the casing that the fan is located between the air inlet and the air outlet, the combiner has refractive power, the fan is an axial flow fan, and the air inlet is aligned with the air outlet that the air inlet and the air outlet are substantially at the same height.

* * * * *